United States Patent [19]
Lutz

[11] 3,829,155
[45] Aug. 13, 1974

[54] CONTROL DEVICE FOR POWER OPERATED AUTOMOBILE SLIDING ROOFS

[75] Inventor: Alfons Lutz, Krailling, Germany

[73] Assignee: Webasto-Werk W. Baier KG, Stockdorf/Munich, Germany

[22] Filed: June 22, 1973

[21] Appl. No.: 372,671

[30] Foreign Application Priority Data
July 4, 1972    Austria ........................... 85733/72

[52] U.S. Cl. ............................ 296/137 F, 318/468
[51] Int. Cl. .............................................. B60j 7/00
[58] Field of Search ........ 296/137 E, 137 F, 137 G, 296/137 H; 200/61.71, 61.72, 61.73, 61.74, 61.75; 318/468

[56] References Cited
UNITED STATES PATENTS

| 774,463 | 11/1904 | Avery | 200/61.75 |
| 2,973,991 | 3/1961 | Werner | 296/137 G |
| 3,702,430 | 11/1972 | Knetsch | 318/468 |

*Primary Examiner*—Allen N. Knowles
*Attorney, Agent, or Firm*—Joseph A. Geiger

[57] ABSTRACT

A control device for power operated sliding roof panels of automobiles where the electric motor is controlled by a switch which is operated by the control lever of the sliding roof mechanism whenever the closed position is reached. The control lever includes a cam arm portion guided by a cam groove which operates the switch.

3 Claims, 3 Drawing Figures

1

CONTROL DEVICE FOR POWER OPERATED AUTOMOBILE SLIDING ROOFS

BACKGROUND OF THE INVENTION

1. Field of the Invention

The present invention relates to control devices for electrically operated closure panels and the like, and in particular to so-called power sliding roofs for automobiles, where the movable roof panel can be opened in a first mode by pivoting its rear portion upwardly from the closed position, and in a second mode by lowering the closure panel and retracting it under the stationary roof portion.

2. Description of the Prior Art

The electrical stop and start controls for prior art power sliding roofs of the above-mentioned kind normally use end switches for the purpose of automatically shutting down the electric motor, when the closure panel reaches its closed position from either direction. These end switches would be arranged either on the forward cross member or in the rear stationary portion of the roof structure, and they would be operated by the closure panel itself or some other moving part abutting against the switch, thereby stopping the closure panel in the proper position.

In cases where cables have been used as drive elements between the electric motor and the closure panel, it has also become known to use specific parts of the cable drive itself for the operation of control switches. Another prior art device of the type described above is disclosed in U.S. Pat. No. 3,702,430.

The aforementioned prior art solutions have several shortcomings:

They are comparatively complex, because they require switching operations after the pivoting motion as well as after the retracting motion of the closure panel so that several separate switches are required. Furthermore, it is necessary in such cases not only to adjust the moving control lever for the exact closure position of the closure panel, but it is also necessary to adjust at least one of the control switches.

SUMMARY OF THE INVENTION

It is a primary objective of the present invention to suggest a control device for power sliding roofs of the above-mentioned type which is extremely simple in structure and does not have the earlier-mentioned shortcomings. The invention proposes to attain the above objective by suggesting a single switch in the power supply of the electric motor which is so arranged in relation to a control lever which is connected to the rear portion of the closure panel that the switch is operated in the closed position of the panel.

In a preferred embodiment of the invention the control lever includes a cam arm whose far end is guided inside a cam groove and which includes a laterally extending finger with which it operates the control switch.

In a most simple arrangement of the proposed device, the switching member of the control switch is so arranged that it protrudes into the cam groove area of the cam arm portion of the control lever. In this case the guided cam arm portion also operates the control switch whenever the closure panel reaches the closed position. In each of the mentioned embodiments it is thus possible, by adjusting the control lever for the exact closure position of the closure panel, to simultaneously adjust the desired operation of the control switch for the closed position.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows.

DESCRIPTION OF THE PREFERRED EMBODIMENT

Figure 1:
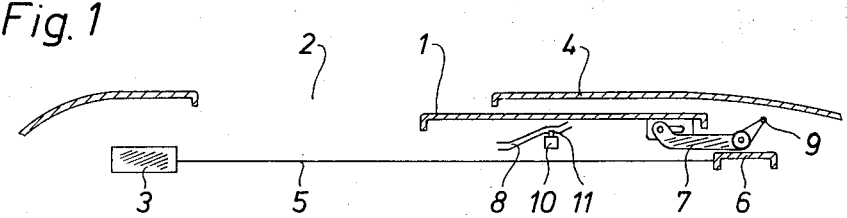
FIG. 1 shows in an elevational cross section a schematic representation of a power operated sliding roof embodying the invention, the closure panel being shown in its retracted open position.

As can be seen in FIG. 1, the movable closure panel 1 can be lowered out of its roof opening 2 and retracted under the stationary roof portion 4 by means of an electric motor 3 and a push-pull cable drive 5. The far end of the cable 5 is attached to a transversely extending bridge member 6 which is guided for longitudinal motion relative to the stationary roof portion 4 by means of lateral guides (not shown). The bridge member 6 carries on top of it a pivotable control lever 7 whose forward end is connected to the rear portion of the closure panel 1, thereby controlling the longitudinal motion as well as the pivoting motion of the closure panel 1. The pivoting motion of control lever 7 in relation to the bridge member 6 is controlled by a cam arm portion extending rearwardly from the control lever 7, the end 9 of the cam arm portion engaging a cam groove 8, as the control lever 7 is longitudinally moved by the bridge member 6. The cam operation may be accomplished, for example, by means of a laterally extending pin at the end 9 of the cam arm portion of control lever 7 which engages the cam groove 8. The connection between the forward end of control lever 7 and the rear portion of closure panel 1 further includes a short longitudinal slot which is necessary to allow the closure panel to move vertically into and out of its closed position, while the control lever makes a combined longitudinal and pivoting displacement.

Figure 2:
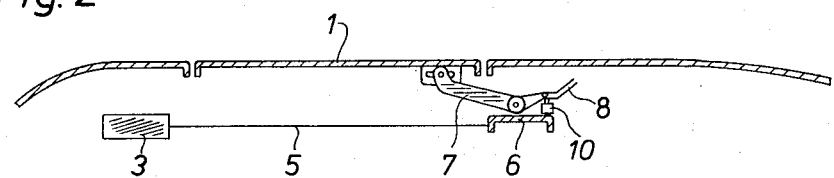
FIG. 2 shows the arrangement of FIG. 1 with the closure panel in its closed position.

Near the cam groove 8 is arranged a stationary switch 10 which has a switching member 11 reaching into the area of the cam groove 8 so that the finger at the end 9 of the cam arm portion of lever 7 operates the switching member 11 of switch 10 when the closure panel 1 is in its closed position, as shown in FIG. 2.

Figure 3:
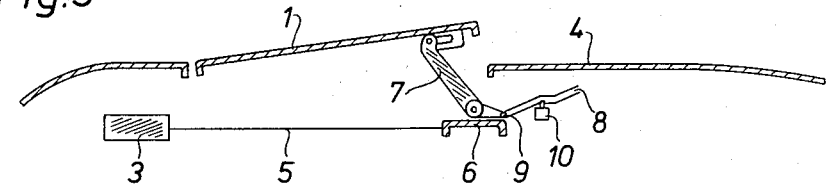
FIG. 3 shows the same arrangement with the closure panel in its upward-pivoted open position.

The switch 10 is similarly operated, when the closure panel 1 returns to its closed position from its upwardly pivoted open position shown in FIG. 3, in which case the finger moves against the switching member 11 from the opposite direction.

This arrangement assures that, when the sliding roof drive is operated to close the panel from either its upwardly opened or its retracted opened position, the drive motor 3 is interrupted automatically as soon as the closure panel 1 reaches its closed position.

It should be understood that the present invention is not restricted to the embodiment described above by way of example, but that it is possible to devise equivalent modifications of the control lever or of the other control members of the proposed arrangement. It is important, however, that in each case the control switch is operated by the control member in the closed position of the sliding roof panel.

What is claimed is:

1. A control device for a power operated closure panel such as a sliding roof panel in an automobile roof, for example, where the movable roof panel can be opened out of its closed position in the roof opening in a first opening mode by raising its rear portion out of the roof opening, or in a second mode by lowering its rear portion out of the roof opening and retracting the movable panel under the stationary roof portion, the device comprising in combination:

a transverse bridge member under the stationary roof structure adjacent the rear portion of the movable roof panel and so arranged that it can be advanced and retracted under the stationary roof structure along horizontal guides;

an electric motor and a drive connection between the latter and the bridge member;

a control lever linking the rear portion of the movable panel to the bridge member, the control lever being pivotable on the bridge member so as to permit raising and lowering of the panel rear portion relative to the bridge member into and out of the roof opening in both directions;

a control circuit for the electric motor which includes a stationary switch in the movement path of the control lever, the switch being so arranged that it is operated by the control member, when the movable panel reaches its closed position in alignment with the roof opening from either direction.

2. A control device as defined in claim 1, wherein:

the control lever is of the double lever type, having a forward portion connected to the panel rear portion, a pivot attachment on top of the bridge member, and a rearwardly extending cam arm portion;

the stationary roof structure includes a cam groove inside which the far end of the cam arm portion is received, thereby controlling the raising and lowering of the panel rear portion, as the bridge member is advanced or retracted; and the switch is so positioned that it is operated by the cam arm portion of the control lever when the movable panel reaches its closed position.

3. A control device as defined in claim 2, wherein:

the stationary switch includes a switching member which reaches into the area of the cam groove; and the cam arm portion of the control lever includes a cam finger with which it engages the cam groove and with which it also actuates the switching member of the switch.

* * * * *